(12) United States Patent
Nakatani et al.

(10) Patent No.: US 12,131,482 B2
(45) Date of Patent: Oct. 29, 2024

(54) LEARNING APPARATUS, FOREGROUND REGION ESTIMATION APPARATUS, LEARNING METHOD, FOREGROUND REGION ESTIMATION METHOD, AND PROGRAM

(71) Applicant: SONY INTERACTIVE ENTERTAINMENT INC., Tokyo (JP)

(72) Inventors: Ayaka Nakatani, Chiba (JP); Hidehiko Morisada, Tokyo (JP); Takayuki Shinohara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 699 days.

(21) Appl. No.: 17/288,235

(22) PCT Filed: Sep. 17, 2019

(86) PCT No.: PCT/JP2019/036431
§ 371 (c)(1),
(2) Date: Apr. 23, 2021

(87) PCT Pub. No.: WO2020/110432
PCT Pub. Date: Jun. 4, 2020

(65) Prior Publication Data
US 2021/0350547 A1 Nov. 11, 2021

(30) Foreign Application Priority Data

Nov. 26, 2018 (WO) .................. PCT/JP2018/043375

(51) Int. Cl.
*G06T 7/194* (2017.01)
*G06N 20/00* (2019.01)
(Continued)

(52) U.S. Cl.
CPC ............. *G06T 7/194* (2017.01); *G06N 20/00* (2019.01); *G06T 7/90* (2017.01); *G06V 10/82* (2022.01);
(Continued)

(58) Field of Classification Search
CPC ....................... G06T 7/194; G06T 7/90; G06T 2207/10016; G06T 2207/10152;
(Continued)

(56) References Cited

U.S. PATENT DOCUMENTS

| 2004/0062450 A1* | 4/2004 | Kondo | G06T 7/215 348/E5.058 |
| 2010/0092074 A1* | 4/2010 | Liang | G06V 40/107 382/159 |
| 2018/0089523 A1* | 3/2018 | Itakura | G06T 7/11 |
| 2018/0328789 A1* | 11/2018 | Kido | G06T 7/00 |

FOREIGN PATENT DOCUMENTS

| JP | 2008-165792 A | 7/2008 |
| JP | 2014-203157 A | 10/2014 |

(Continued)

OTHER PUBLICATIONS

International Preliminary Report on Patentability mailed Jun. 10, 2021, from PCT/JP2019/036431, 13 sheets.

(Continued)

*Primary Examiner* — Vu Le
*Assistant Examiner* — Winta Gebreslassie
(74) *Attorney, Agent, or Firm* — XSENSUS LLP

(57) ABSTRACT

Estimation data indicating a foreground region is generated with high precision. A learning apparatus includes an input-image acquisition section that acquires a combination of a first input image representing a background and a foreground and a second input image representing the background in a mode different from that in the first input image, and a learning section that includes an estimation section to (Continued)

generate estimation data indicating the foreground region in the first input image in response to input of the first input image and the second input image, and that conducts learning at the estimation section on the basis of a given teacher image and the estimation data that is generated when the first input image and the second input image are inputted.

21 Claims, 12 Drawing Sheets

(51) Int. Cl.
*G06T 7/90* (2017.01)
*G06V 10/82* (2022.01)
*G06V 40/10* (2022.01)

(52) U.S. Cl.
CPC .... *G06V 40/10* (2022.01); *G06T 2207/10016* (2013.01); *G06T 2207/10152* (2013.01); *G06T 2207/20081* (2013.01); *G06T 2207/20212* (2013.01)

(58) Field of Classification Search
CPC ........... G06T 2207/20081; G06T 2207/20212; G06N 20/00; G06V 40/10; G06V 10/82
See application file for complete search history.

(56) References Cited

FOREIGN PATENT DOCUMENTS

JP 2016-181068 A 10/2016
WO WO-2016139868 A1 * 9/2016 ............... G06T 7/20

OTHER PUBLICATIONS

Decision to Grant a Patent dated Sep. 21, 2021, from Japanese Patent Application No. 2020-558117, 2 sheets.
International Search Report and Written Opinion mailed Dec. 3, 2019, from PCT/JP2019/036431, 7 sheets.
Ning Xu, et al., "Deep Image Matting," [online], Apr. 11, 2017, archive [searched on Oct. 1, 2018], <URL: https://arxiv.org/pdf/1703.03872>.

* cited by examiner

LEARNING APPARATUS, FOREGROUND REGION ESTIMATION APPARATUS, LEARNING METHOD, FOREGROUND REGION ESTIMATION METHOD, AND PROGRAM

TECHNICAL FIELD

The present invention relates to a learning apparatus, a foreground region estimation apparatus, a learning method, a foreground region estimation method, and a program.

BACKGROUND ART

Technologies such as background subtraction and keying for generating, from an image including a background and a foreground, estimation data indicating the foreground region have been known. In background subtraction, for example, a first input image representing a background and a foreground and a second input image representing the background are subtracted to estimate the foreground region and the background region. For example, the first input image is a human image including a natural scenery as the background thereof. Examples of keying include what is called a chroma key technology of photographing an image the background whose color is one specific color and putting another image on the specific color region of the photographed image.

In addition, there has been an image matting technology of estimating a foreground region by using, together with an image including the foreground and a background, a label image that indicates three regions. The label image is called a trimap image. Here, the three regions are a region representing a foreground, a region representing a background, and a region in which it is uncertain as to whether a foreground is represented or a background is represented. Further, there has been a deep image matting technology of generating estimation data indicating a foreground region by applying deep learning to the image matting (see NPL 1 described below). This technology is implemented by a machine learning model having learned a learning image, whereby a foreground region is estimated with high precision.

CITATION LIST

Non Patent Literature

[NPL 1]
Ning Xu, et al., "Deep Image Matting," [online], Apr. 11, 2017, archive [searched on Oct. 1, 2018], <URL: https://arxiv.org/pdf/1703.03872>

SUMMARY

Technical Problems

In a case where background subtraction or keying is used, the background included in the aforementioned first input image varies with time. For example, the camera set position, direction, or zooming varies in some cases. In addition, when the first input image and the second input image are photographed at different times, the color or the intensity of light applied to a subject of the background may vary, and also, the length of a shadow generated by the light may vary. Moreover, a subject included in the background is added or eliminated, in some cases. For these reasons, even when an image including a background only is photographed immediately after an image including a human, etc., in the foreground thereof is photographed, regions represented by the background included in both the images rarely, completely match. In such a case, it is difficult to estimate the foreground region by using background subtraction or keying.

Further, chroma key, which is a kind of keying, enables estimation of a foreground region with relative ease. However, in a case where chroma key is used, a fabric of a single color, such as green, as a background, an illumination device suitable for the background color, and the like, need to be prepared. This involves time and effort. In order to use image matting, a trimap for each image whose foreground region is to be estimated needs to be manually created. In particular, in a case where image matting is applied to video images, an enormous amount of time is required to create a trimap for each frame.

The present invention has been made in view of the above problems, and an object thereof is to provide a learning apparatus, a foreground region estimation apparatus, a learning method, a foreground region estimation method, and a program, the learning apparatus generating estimation data indicating a foreground region with high precision and ease, even in a case where acquiring a first input image representing a background and the foreground, and a second input image representing the background in a mode different from that in the first input image.

Solution to Problems

In order to solve the above problem, a learning apparatus according to the present invention includes an input-image acquisition section that acquires a combination of a first input image representing a background and a foreground and a second input image representing the background in a mode different from that in the first input image, and a learning section that includes an estimation section to generate estimation data indicating the foreground region in the first input image in response to input of the first input image and the second input image, and that conducts learning at the estimation section on the basis of a given teacher image and the estimation data that is generated when the first input image and the second input image are inputted to the estimation section.

In the above aspect, the given teacher image includes a first teacher image representing the foreground region in the first input image.

In the above aspect, the given teacher image includes a second teacher image representing the foreground in a mode the same as that in the first input image, and a third teacher image representing the background in a mode the same as that in the first input image, the learning section further includes a composite-image generation section that generates a composite image on the basis of the generated estimation data, the second teacher image, and the third teacher image, and the learning section further conducts learning at the estimation section on the basis of the first input image and the composite image that is generated when the estimation data, the second teacher image, and the third teacher image are inputted to the composite-image generation section.

In this aspect, the input-image acquisition section acquires a combination of the common first input image and each of a plurality of second input images to which different image processing methods have been applied.

In this aspect, the input-image acquisition section acquires, from an object formed by computer graphics-modeling the background, the second input image generated through a rendering.

A foreground region estimation apparatus according to the present invention includes an input-image acquisition section that acquires a combination of a first input image representing a background and a foreground and a second input image representing the background in a mode different from that in the first input image, and an estimation section that generates estimation data indicating the foreground region in response to input of the first input image and the second input image. The estimation section is a machine learning model having conducted learning based on a given teacher image and the estimation data that is generated when the first input image and the second input image are inputted to the estimation section.

In the above aspect, the given teacher image includes a first teacher image representing the foreground region in the first input image.

In the above aspect, the foreground region estimation apparatus further includes a composite-image generation section that generates a composite image on the basis of the generated estimation data, the first input image, and the second input image, the given teacher image includes a second teacher image representing the foreground in a mode the same as that in the first input image, and a third teacher image representing the background in a mode the same as that in the first input image, and the estimation section is a machine learning model having conducted learning based on the first input image and the composite image that is generated when the estimation data, the second teacher image, and the third teacher image are inputted to the composite-image generation section.

In the above aspect, the input-image acquisition section selects and acquires, from among a plurality of candidates of the second input image, the second input image that corresponds to the first input image.

In the above aspect, the candidates are a plurality of images obtained by photographing the background respectively by a plurality of cameras that are set at respective predetermined angles of view and in respective relative photographing directions.

In the above aspect, the input-image acquisition section selects and acquires, from among the candidates, the second input image that corresponds to the first input image by performing feature-point matching.

In the above aspect, the candidates are a plurality of images obtained by photographing the background illuminated with lights of different colors, and the input-image acquisition section selects and acquires, from among the candidates, the second input image that corresponds to the first input image on the basis of pixel color information regarding a position of the background indicated by the estimation data having been already generated.

In the above aspect, the candidates are images generated to represent the background in a state of being illuminated with a light, from an image representing the background photographed in a state of not being illuminated with the light, on the basis of a reflection characteristic of each item included in the background.

In the above aspect, the foreground region estimation apparatus further includes a selection section that selects one piece of estimation data from among a plurality of pieces of the estimation data generated on the basis of the common first input image and a plurality of the second input images inputted in combination with the common first input image.

In the above aspect, the input-image acquisition section further acquires a third input image that is a still image constituting a portion of video images sequentially taken in different photographing directions, the second input image is acquired on the basis of a plurality of candidate images that are previously photographed in different photographing directions, and the estimation section generates estimation data indicating the foreground region in response to input of the third input image and the second input image.

In the above aspect, an image photographed in a photographing direction closest to a photographing direction in which the third input image is photographed is selected as the second input image from among the plurality of candidate images.

In the above aspect, the second input image is generated on the basis of an image selected on the basis of a difference between a photographing direction of each of the plurality of candidate images and a photographing direction in which the third input image is photographed.

A learning method according to the present invention includes a step of acquiring a combination of a first input image representing a background and a foreground and a second input image representing the background in a mode different from that in the first input image, and a step of conducting learning at an estimation section on the basis of a given teacher image and estimation data that is generated when the first input image and the second input image are inputted to the estimation section, the estimation section generating the estimation data indicating the foreground region in response to input of the first input image and the second input image.

A foreground region estimation method according to the present invention, includes a step of acquiring a combination of a first input image representing a background and a foreground and a second input image representing the background in a mode different from that in the first input image, and a step of causing an estimation section to generate estimation data indicating the foreground region by inputting the first input image and the second input image to the estimation section, the estimation section being a machine learning model having conducted learning based on a given teacher image and the estimation data that is generated when the first input image and the second input image are inputted.

A program according to the present invention causes a computer to execute a procedure of acquiring a combination of a first input image representing a background and a foreground and a second input image representing the background in a mode different from that in the first input image, and a procedure of conducting learning at an estimation section on the basis of a given teacher image and estimation data that is generated when the first input image and the second input image are inputted to the estimation section, the estimation section generating the estimation data indicating the foreground region in response to input of the first input image and the second input image.

A program according to the present invention causes a computer to execute a procedure of acquiring a combination of a first input image representing a background and a foreground and a second input image representing the background in a mode different from that in the first input image, and a procedure of causing an estimation section to generate estimation data indicating the foreground region, by inputting the first input image and the second input image to the estimation section, the estimation section being a machine learning model having conducted learning based on a given teacher image and the estimation data that is generated when the first input image and the second input image are inputted.

DESCRIPTION OF EMBODIMENTS

First Embodiment

Figure 1:
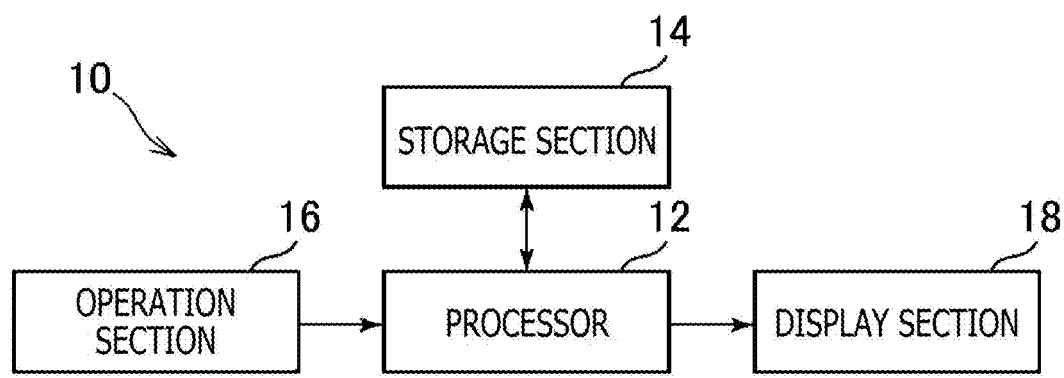
FIG. 1 is a configuration example of an image processing apparatus according to a first embodiment of the present invention.

Hereinafter, a first embodiment of the present invention will be explained in detail on the basis of the drawings. FIG. 1 is a configuration diagram of an image processing apparatus 10 according to the present embodiment.

The image processing apparatus 10 according to the present embodiment is a computer such as a game console or a personal computer. As depicted in FIG. 1, the image processing apparatus 10 according to the present embodiment includes a processor 12, a storage section 14, an operation section 16, and a display section 18, for example.

The processor 12 is a program control device, such as a central processing unit (CPU), that operates according to a program installed in the image processing apparatus 10, for example.

The storage section 14 is a storage element such as a read only memory (ROM) or a random access memory (RAM), a hard disk drive, or the like. The storage section 14 stores, for example, a program which is executed by the processor 12.

The operation section 16 is a user interface such as a keyboard, a mouse, or a game console controller, and receives an operation input from a user and outputs a signal indicating the details of the input to the processor 12.

The display section 18 is a display device such as a liquid crystal display and displays various types of images according to a command from the processor 12.

It is to be noted that the image processing apparatus 10 may include a communication interface such as a network board, an optical disc drive for reading optical discs such as a versatile disc (DVD)-ROM or a Blu-ray (registered trademark) disc, a universal serial bus (USB) port, and the like.

A machine learning model having conducted learning is installed in the image processing apparatus 10 according to the present embodiment. The machine learning model is used to generate estimation data 212 indicating a foreground region in a first input image 204 in response to input of the first input image 204 representing a background and a foreground and a second input image 206 representing the background in a mode different from that in the first input image 204.

Further, in the present embodiment, learning at the estimation section 210 is executed. Learning that is executed by the estimation section 210 will be explained with reference to FIG. 2 which depicts a learning mode.

It is assumed here that data for use in the learning at the estimation section 210 is referred to as learning data. The learning data includes the first input image 204, the second input image 206, and a given teacher image.

Figure 2:
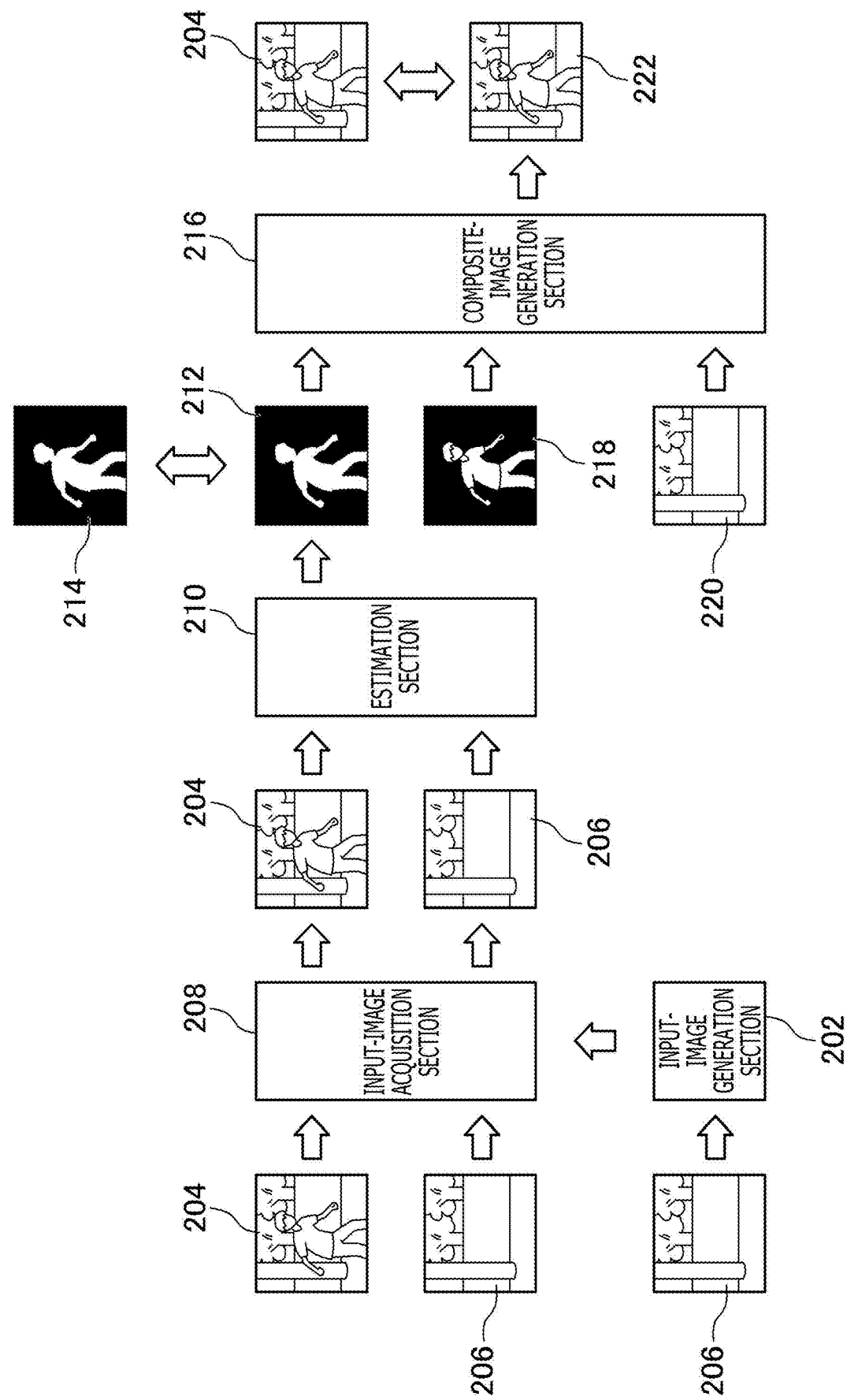
FIG. 2 is a diagram depicting one example of learning according to the first embodiment of the present invention.

First, the input-image acquisition section 208 acquires a combination of the first input image 204 representing a background and a foreground and the second input image 206 representing the background in a mode different from that in the first input image 204. Specifically, for example, the input-image acquisition section 208 acquires the first input image 204 and the second input image 206 depicted in FIG. 2. The first input image 204 in FIG. 2 is an image photographed with plants, etc., as the background and a human as the foreground. Here, examples of the different mode include a case where both the input images are photographed at different angles of view and a case where both the input images are photographed in a state where the position or the shape of an item included in the background is different, for example.

It is to be noted that the input-image acquisition section 208 may acquire the first input image 204 and the second input image 206 by partially scaling the images. Specifically, the acquired image representing the background and the foreground and the acquired image representing the background in a different mode may have a 4K size, for example. In this case, the input-image acquisition section 208 may generate 320×320-size images by compressing the above images, so as to acquire the images as the first input image 204 and the second input image 206, respectively.

Further, the input-image acquisition section 208 may acquire the first input image 204 and the second input image 206 after partially cropping the images. Specifically, for example, in a case where a foreground region in a background-and-foreground representing image is small, the input-image acquisition section 208 may acquire, as the first input image 204, an image obtained by cropping a peripheral region of the foreground representing region. In this case, the input-image acquisition section 208 may crop, from the background representing image, a region that corresponds to the region cropped from the background-and-foreground representing image, and acquires the cropped region as the second input image 206.

The distinction between the background and the foreground is made by user recognition. That is, a user inputs, as the first input image 204, an image that the user recognizes as an image including both a background and a foreground, to the input-image acquisition section 208. Further, the user inputs, as the second input image 206, an image that the user recognizes as an image including the background only, to the input-image acquisition section 208. Therefore, a human who is different from a human included in the foreground may be included in the background.

In addition, it is preferable that what is called augmentation is executed in order to inhibit overlearning at the estimation section 210. Specifically, the input-image generation section 202 may generate a plurality of the second input images 206 on which different image processing methods have been applied on the basis of one image representing the background in a mode different from that in the first input image 204. For example, the input-image generation section 202 may generate the second input images 206 having different gamma values set with respect to the one image representing the background in a mode different from that in the first input image 204. Alternatively, for example, the input-image generation section 202 may generate the second input images 206 by adding different noises to one image representing the background in a mode different from that in the first input image 204. Alternatively, for example, the input-image generation section 202 may generate the second input images 206 by changing (for example, deleting, adding, or changing the position) a portion of a photographed item included in the background in one image representing the background in a mode different from that in the first input image 204.

In this case, the input-image acquisition section 208 acquires a plurality of the second input images 206 generated by the input-image generation section 202. That is, the input-image acquisition section 208 acquires a combination of the common first input image 204 and the second input images 206 to which the different image processing methods have been applied.

It is to be noted that the input-image generation section 202 may perform gamma value setting change and noise processing not only on the second input images 206, but also on the first input image 204, a second teacher image 218, and a third teacher image 220.

Moreover, the input-image generation section 202 may generate the second input image 206 from an object formed by computer graphics (CG)-modeling the background, through a rendering. Specifically, for example, the user may previously CG-model the background by using laser sensing or photogrammetry. Then, the input-image acquisition section 208 may generate, from the object formed by the CG-modeling, the first input image 204 that corresponds to the second input image 206 through a rendering.

Moreover, the input-image acquisition section 208 acquires a combination of the first input image 204 and the second input image 206 generated by the input-image generation section 202. Since the first input image 204 and the second input image 206 are generated through a rendering, the first input image 204 and the second input image 206 that are generated at different angles of view or from different viewpoints can be acquired.

As explained so far, the input-image generation section 202 can generate a plurality of pieces of learning data on the basis of a pair including the first input image 204 and one image representing a background in a mode different from that in the first input image 204.

The estimation section 210 generates the estimation data 212 indicating the foreground region in the first input image 204 in response to input of the first input image 204 and the second input image 206. Specifically, for example, the first input image 204 and the second input image 206 acquired by the input-image acquisition section 208 are inputted to the estimation section 210. Then, the estimation section 210 generates the estimation data 212 indicating the foreground region in the first input image 204 in response to input of the first input image 204 and the second input image 206. For example, the estimation data 212 is an alpha map having an alpha value of 1 in a coordinate indicating the foreground and having an alpha value of 0 in a coordinate indicating the background. It is to be noted that the alpha values are not limited to values of 0 and 1. For example, each of the alpha values may be a real number of 0 to 1 or may be an integer of 0 to 255.

The estimation section 210 is a machine learning model implemented by a convolution neural network (CNN), for example. The entire neural network included in the estimation section 210 includes an encoder network and a decoder network. It is desirable that the encoder network and the decoder network each have a bridge structure which is a technology in the past.

In a case where the image processing apparatus 10 functions as a foreground region estimation apparatus, the estimation section 210 is a machine learning model having conducted learning based on a given teacher image and the estimation data 212 which is generated when the first input image 204 and the second input image 206 are inputted to the estimation section 210. The given teacher image is acquired by a teacher-image acquisition section 704 (see FIG. 7). The given teacher image includes a first teacher image 214, the second teacher image 218, and the third teacher image 220.

The first teacher image 214 is the estimation data 212 (e.g., alpha map) that correctly indicates the foreground region in the corresponding first input image 204. The second teacher image 218 is a correct image (i.e., a correct image of the foreground) indicating only the foreground included in the first input image 204. The third teacher image 220 is a correct image (i.e., a correct image of the background) including the background included in the first input image 204 and including the background that is represented in a region occupied by the foreground in the first input image 204.

In the learning according to the present embodiment, first, the first input image 204 and the second input image 206 included in learning data are inputted to the estimation section 210. Subsequently, in response to the input of the first input image 204 and the second input image 206, the estimation section 210 generates an alpha map as the estimation data 212.

Then, a comparison result (hereinafter, a first deviation) of the alpha map with the first teacher image 214 inputted to a learning section 702 (see FIG. 7) is identified. For example, the first deviation may be data having a value of 0 to 1. In this case, the first deviation may be data the value of which is 0 in a case where the generated alpha map matches the first teacher image 214, and the value of which is 1 when the generated alpha map does not match the first teacher image 214.

Moreover, in the present embodiment, the value of a parameter for the estimation section 210 is updated on the basis of, for example, the deviation of the alpha map from the first teacher image 214 inputted to the learning section 702 by a deviation reverse propagation method, for example. Further, a plurality of combinations of the first input images 204 and the second input images 206 are inputted to the estimation section 210. Accordingly, the value of the parameter for the estimation section 210 is repeatedly updated. In the manner described so far, the machine learning model implemented by the image processing apparatus 10 is learned.

In the present embodiment, further, learning at the learning section 702 may be conducted by using a composite image 222 that is generated by a composite-image generation section 216. That is, the estimation section 210 may be a machine learning model having conducted learning based on the first input image 204 and the composite image 222 generated in response to input of the estimation data 212, the second teacher image 218, and the third teacher image 220 to the composite-image generation section 216.

The composite-image generation section 216 generates the composite image 222 by executing composition based on the alpha values of a foreground-and-background representing image and a background representing image. For example, the pixel value of a pixel associated with a target pixel in the composite image 222 is decided on the basis of a pixel value of the target pixel included in the foreground representing image, the alpha value of the target pixel in the alpha map, and a pixel value of a pixel associated with the target pixel included in the background representing image.

For example, it is assumed that an R value representing the red gradation value of a target pixel included in the foreground representing image is R1, the alpha value of the target pixel is A, and an R value of a pixel, in the background representing image, having the same coordinate value as the target pixel is R0. Further, it is assumed that the alpha value is an integer of 0 to 255. In this case, a value that is calculated by an expression R0×(1−A/255)+R1×A/255 is decided as the R value of a pixel having the same coordinate value as the target pixel included in the composite image 222. The composite-image generation section 216 generates the composite image 222 by performing a similar processing on the red, green, and blue gradation values of all the pixels.

In addition, the composite-image generation section 216 may generate the composite image 222 on the basis of the foreground-and-background representing image and the alpha map. Specifically, it is assumed that the R value representing the red gradation value of a target pixel included in the foreground representing image is R1, and the alpha value of the target pixel is A. In this case, the composite-image generation section 216 decides that a value calculated by an expression R1×A/255 is the R value of a pixel having the same coordinate value as the target pixel included in the composite image 222. Further, the composite-image generation section 216 decides that the alpha value of the target pixel included in the composite image 222 is A. The composite-image generation section 216 generates the composite image 222 by performing a similar processing on the red, green, and blue gradation values of all the pixels. That is, the composite-image generation section 216 may generate the composite image 222 representing the foreground only with a transparent background.

In the learning according to the present embodiment, first, the generated estimation data 212 and the second teacher image 218 and third teacher image 220 included in the learning data are inputted to the composite-image generation section 216. Here, the second teacher image 218 is a correct image (i.e., a correct image of the foreground) that represents only the foreground included in the first input image 204. The third teacher image 220 is a correct image (i.e., a correct image of the background) that includes the background included in the first input image 204 and the background represented in a region occupied by the foreground in the first input image 204. Subsequently, by the aforementioned method, the composite-image generation section 216 generates the composite image 222 on the basis of the generated estimation data 212, the second teacher image 218, and the third teacher image 220.

Further, a comparison result (second deviation) of the composite image 222 with the first input image 204, which is a teacher image inputted to the estimation section 210, is identified. Here, the second deviation may be data having a value of 0 to 1, for example. In this case, the second deviation may be data the value of which is 0 in a case where the generated composite image 222 matches the first input image 204, and the value of which is 1 in a case where the generated composite image 222 does not match the first input image 204, for example.

Moreover, in the present embodiment, the value of a parameter for the estimation section 210 is updated on the basis of, for example, the deviation of the composite image 222 from the first input image 204 inputted to the learning section 702 by a deviation reverse propagation method, for example. Further, a plurality of combinations of the first input images 204 and the second input images 206 are inputted to the estimation section 210. Accordingly, the value of the parameter for the estimation section 210 is repeatedly updated. In the manner described so far, the machine learning model implemented by the image processing apparatus 10 may be learned.

As explained so far, the learning section 702 repeatedly identifies the first deviation and/or the second deviation, so that learning is conducted. It is to be noted that either one of learning using the first deviation and learning using the second deviation may be conducted, or both of them may be conducted.

Figure 3:
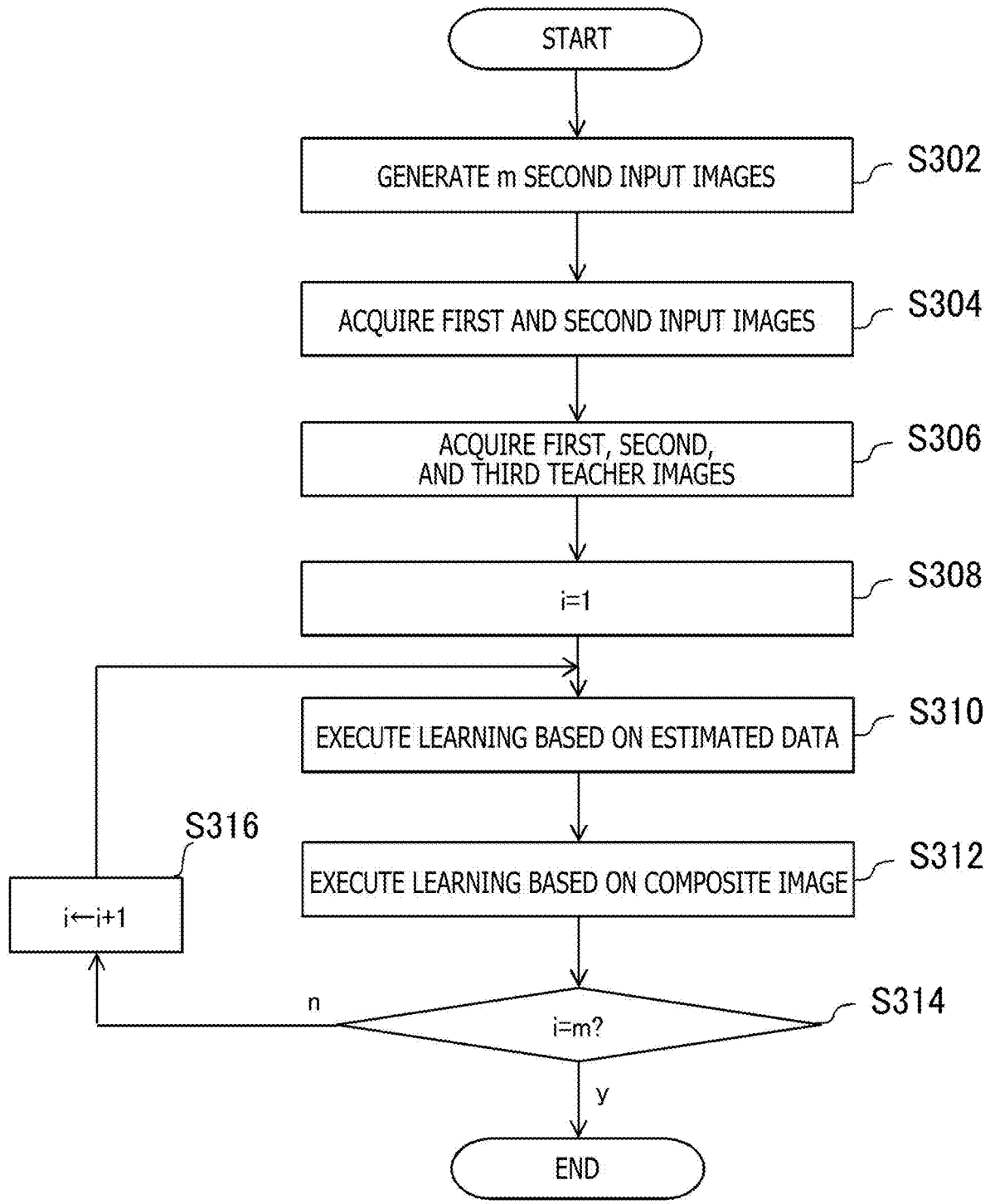
FIG. 3 is a flowchart representing one example of a learning process flow which is executed by the image processing apparatus according to the first embodiment of the present invention.

Next, a learning flow which is executed by the estimation section 210 using the first deviation and the second deviation will be explained with reference to FIG. 3. Here, it is assumed that, for example, 5×m (m is a natural number) pieces of learning data are acquired. Further, it is assumed that the 5×m pieces of learning data are divided into data groups each including five pieces of data. Each of the data groups include the first input image 204, the second input image 206, the first teacher image 214, the second teacher image 218, and the third teacher image 220. Hereinafter, a data group that is the i-th (1≤i≤m) one is referred to as an i-th data group.

First, the input-image generation section 202 receives one image representing a background in a mode different from that in the first input image 204 and generates the m second input images 206 on which different image processing methods based on the image have been applied (S302). Next, the input-image acquisition section 208 acquires the m generated second input images 206 in combination with the common first input image 204 (S304).

Further, the teacher-image acquisition section 704 acquires the first teacher image 214, the second teacher image 218, and the third teacher image 220 that correspond to the first input image 204 acquired at S302 (S306).

Then, the learning section 702 sets the value of the variable i to 1 (S308). Next, the learning section 702 conducts learning based on an alpha map in the estimation section 210, by using three pieces of learning data included in the i-th data group (S310). The three pieces of learning data are the first input image 204, the second input image 206, and the first teacher image 214. Moreover, the learning section 702 conducts learning at the estimation section 210 based on the composite image 222 by using two pieces of learning data included in the i-th data group (S312). The two pieces of learning data are the second teacher image 218 and the third teacher image 220.

Next, the learning section 702 confirms whether or not the value of the variable i is m (S314). In a case where the value is not m (S314: N), the learning section 702 increments the value of the variable i by one (S316), and the process returns to S310. In a case where the value is m (S314: Y), the process indicated by the present process example is finished.

In the present embodiment, a machine learning model having conducted learning at the aforementioned manner, for example, is used to generate the estimation data 212 and generate the composite image 222.

Figure 4:
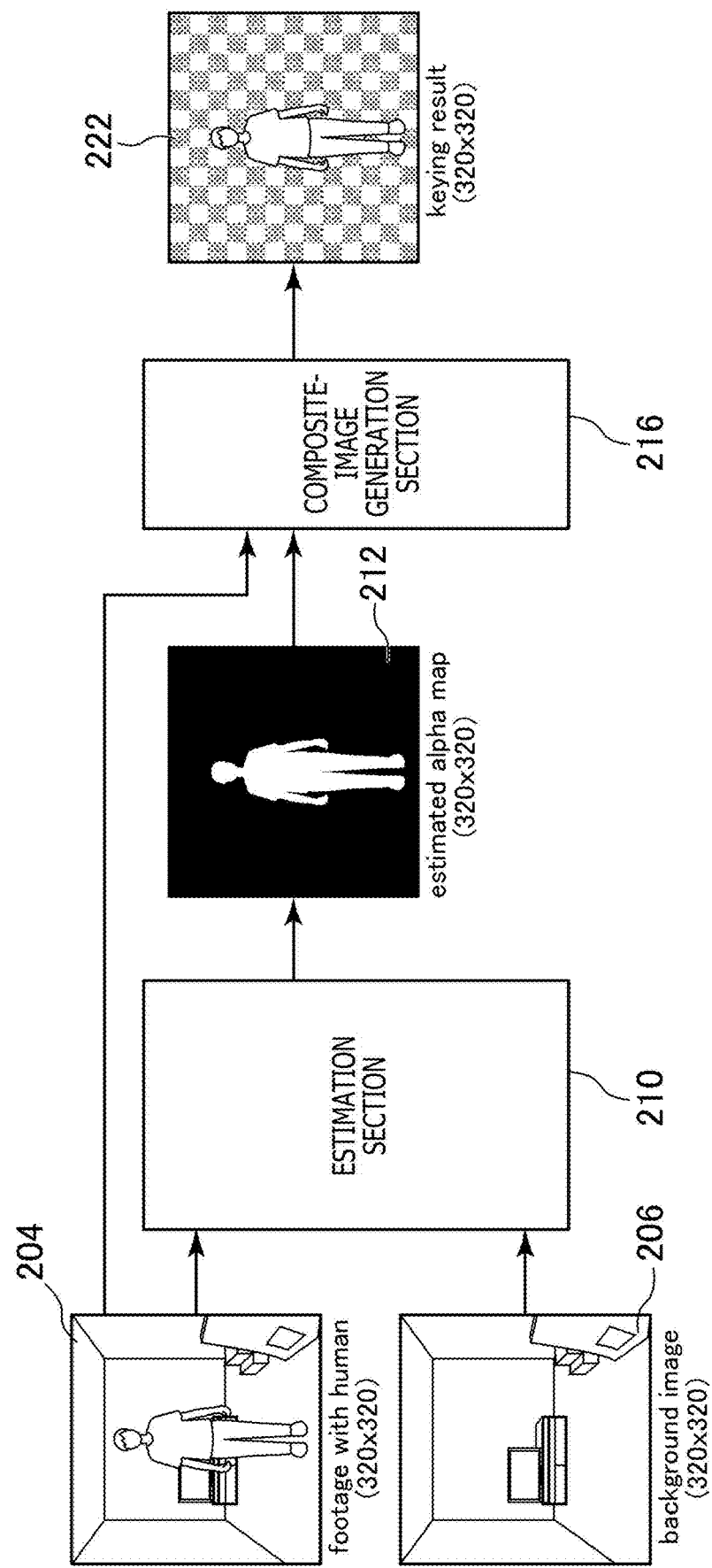
FIG. 4 is a diagram depicting one example of generating an image according to the first embodiment of the present invention.

Hereinafter, generation of the estimation data 212 and generation of the composite image 222 using a machine learning model having conducted learning will be explained with reference to FIG. 4.

First, a combination of the first input image 204 representing a background and a foreground and the second input image 206 representing the background in a mode different from that in the first input image 204 is inputted to the input-image acquisition section 208. For example, a camera held by a user or a camera fixed at a predetermined position photographs an image of a human with furniture, etc., set as the background (first input image 204). Further, the camera photographs, from the same position, an image of a room with the furniture, etc., in a state where the human is out of the photographing range of the camera (second input image 206). It is to be noted that the first input image 204 and the second input image 206 each have a size of 320×320.

Next, the first input image 204 and the second input image 206 acquired by the input-image acquisition section 208 are inputted to the estimation section 210 having conducted learning. Then, in response to the input of the first input image 204 and the second input image 206, the estimation section 210 generates the estimation data 212 indicating the foreground region in the first input image 204. The estimation data 212 thus generated is an alpha map indicating the gradation value ratio of the foreground and the background in each pixel. The size of the alpha map is 320×320.

Then, the composite-image generation section 216 generates the composite image 222 on the basis of the alpha map and the first input image 204. The generated composite image 222 represents only the foreground included in the first input image 204, and the background of the composite image 222 is transparent. The size of the composite image 222 is 320×320.

Figure 5:
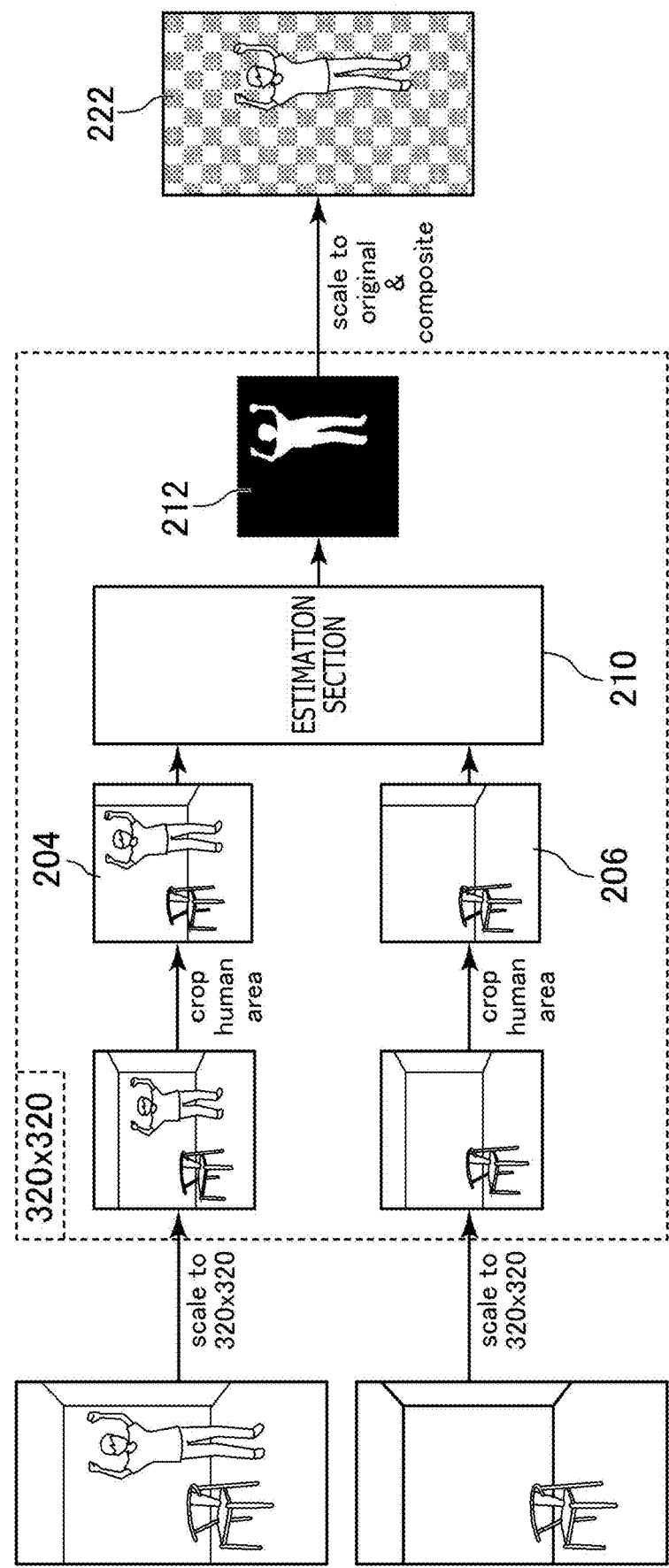
FIG. 5 is a diagram depicting another example of generating an image according to the first embodiment of the present invention.

It is to be noted that the size of an input image does not need to match the size of the estimation data 212 generated by the estimation section 210. Such a case will be explained with reference to FIG. 5.

First, a combination of an image representing a background and a foreground and an image representing the background in a different manner is inputted to the input-image generation section 202. For example, a camera held by a user or a camera fixed at a predetermined position photographs an image of a human with furniture, etc., set as the background (foreground-and-background representing image). Further, the camera photographs, from the same position, an image of a room with the furniture in a state where the human is out of the photographing range of the camera (background representing image). Here, the foreground-and-background representing image and the background representing image each have a 4K size.

Next, the foreground-and-background representing image and the background representing image are each scaled to a 320×320 size. This scaling operation may be manually executed by the user or may be executed by the input-image acquisition section 208. Then, the input-image acquisition section 208 acquires, as the first input image 204 and the second input image 206, images obtained by cropping, from both the images, the peripheries of regions where the foreground is represented. It is to be noted that, in FIG. 5, a region around the human is enlarged in the cropped first input image 204 and the cropped second input image 206.

Next, the first input image 204 and the second input image 206 acquired by the input-image acquisition section 208 are inputted to the estimation section 210 having conducted learning. Further, in response to the input of the first input image 204 and the second input image 206, the estimation section 210 generates the estimation data 212 (e.g., alpha map) indicating the gradation value ratio of the foreground and the background in each pixel. The size of the alpha map thus generated is 320×320. Further, the estimation section 210 changes the size of the alpha map to the size of the original image on the basis of information regarding the image size acquired from the user or the input-image acquisition section 208 before the scaling. That is, the estimation section 210 generates an alpha map of a 4K size. Further, by performing processing similar to the above one, the composite-image generation section 216 generates the composite image 222.

Figure 6:
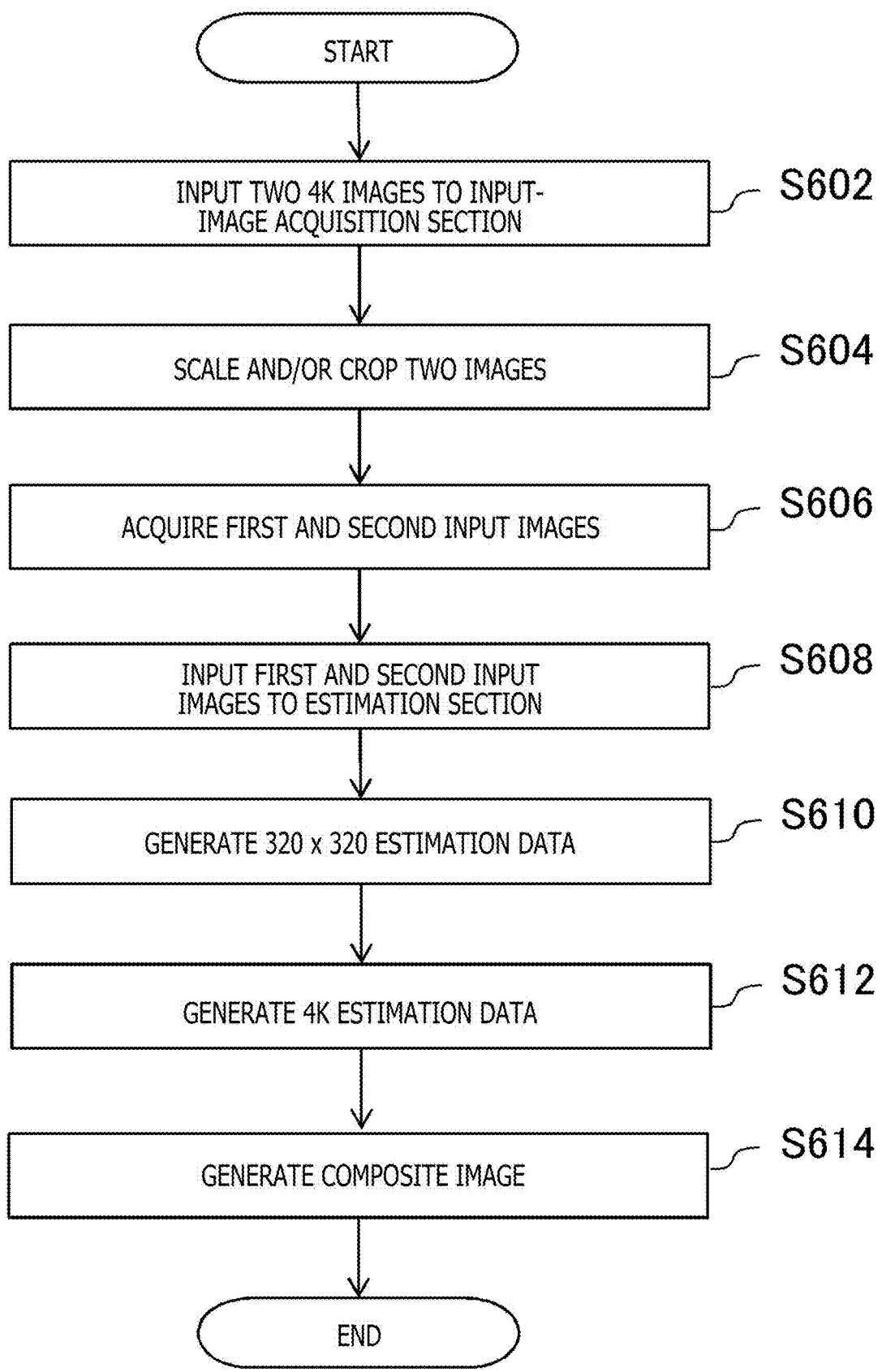
FIG. 6 is a flowchart depicting one example of an image generation flow which is executed by the image processing apparatus according to the first embodiment of the present invention.

Next, one example of the composite image 222 generating flow which is executed by the image processing apparatus 10 according to the present embodiment will be explained with reference to the flowchart represented in FIG. 6.

First, a foreground-and-background representing image and a background representing image each having a 4K size are inputted to the input-image acquisition section 208 (S602). The input-image acquisition section 208 scales and/or crops the foreground-and-background representing image and the background representing image such that the size of each of the images becomes 320×320 (S604). It is to be noted that the input-image acquisition section 208 additionally acquires information regarding the size of the original image, to send the information to the estimation section 210. Then, the input-image acquisition section 208 crops the scaled images and acquires the resultant images as the first input image 204 and the second input image 206 (S606).

Next, the first input image 204 and the second input image 206 are inputted to the estimation section 210 (S608). The estimation section 210 generates the estimation data 212 having a size of 320×320 on the basis of the inputted first input image 204 and second input image 206 (S610). Further, the estimation section 210 generates the estimation data 212 having a 4K size on the basis of information regarding the image size acquired from the user or the input-image acquisition section 208 before the scaling and/or cropping (S612). Further, the composite-image generation section 216 generates, on the basis of the estimation data 212 and the first input image 204, the composite image 222 in which only the foreground included in the first input image 204 is represented and the background is transparent (S614). It is to be noted that, subsequently to S614, the composite-image generation section 216 may further generate, on the basis of the composite image 222 generated at S614 and an image including any background, the composite image 222 which includes the background included the composite image 222 generated at S614 and any background.

Next, the functions of the image processing apparatus 10 according to the present embodiment and processes which are executed by the image processing apparatus 10 will be further explained.

Figure 7:
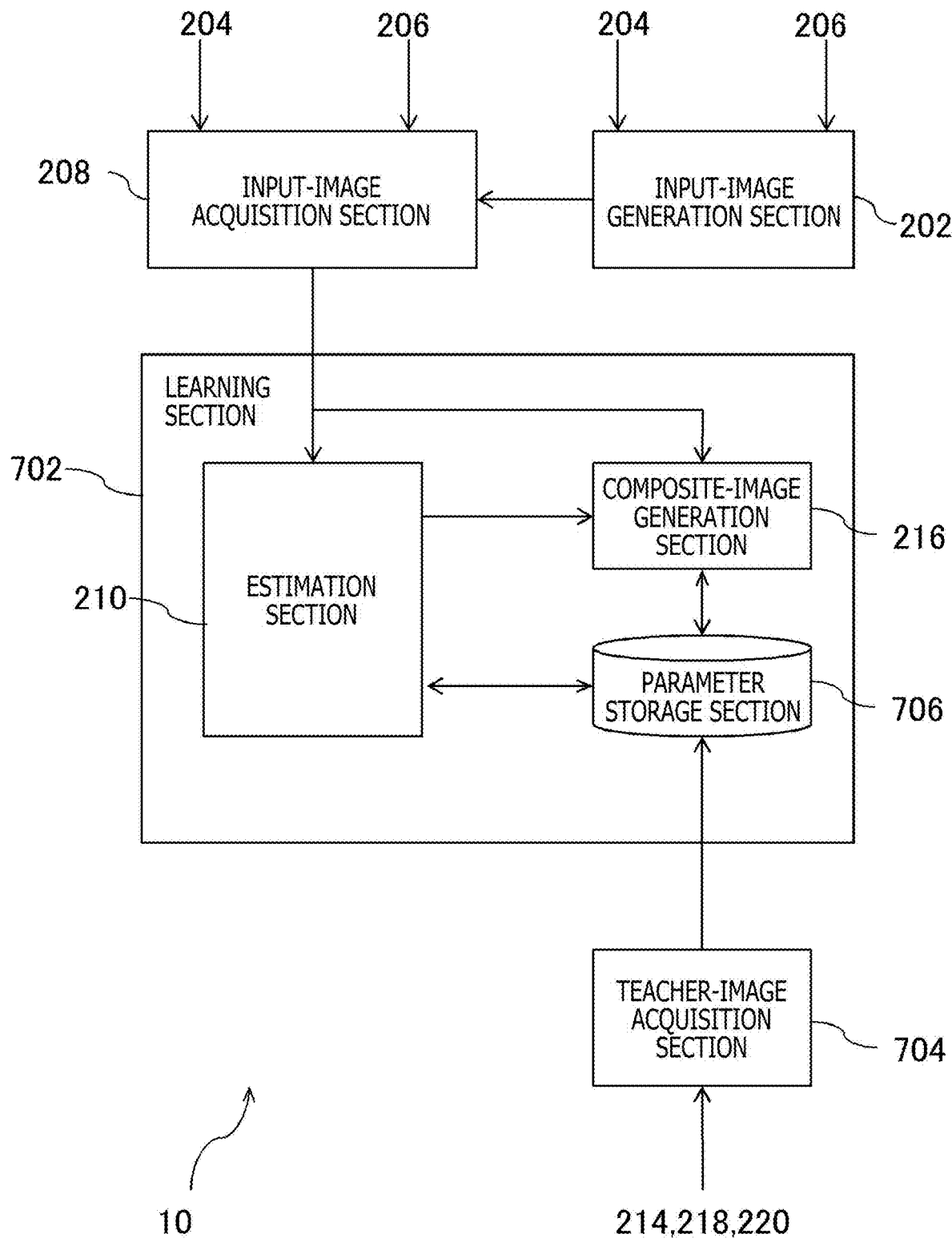
FIG. 7 is a functional block diagram depicting one example of functions which are implemented by the image processing apparatus according to the first embodiment of the present invention.

FIG. 7 is a functional block diagram depicting one example of functions implemented by the image processing apparatus 10 according to the present embodiment. It is to be noted that not all the functions depicted in FIG. 7 are necessarily implemented by the image processing apparatus 10 according to the present embodiment, and further, any function other than the functions depicted in FIG. 7 may be implemented.

As depicted in FIG. 7, the image processing apparatus 10 according to the present embodiment functionally includes the input-image generation section 202, the input-image acquisition section 208, the learning section 702, and the teacher-image acquisition section 704, for example. The learning section 702 includes the estimation section 210, the composite-image generation section 216, and a parameter storage section 706. These sections are implemented mainly by the processor 12 and the storage section 14.

It is to be noted that the input-image generation section 202, the input-image acquisition section 208, the estimation section 210, the composite-image generation section 216, the parameter storage section 706, and the teacher-image acquisition section 704 serve as sections of a learning apparatus. In addition, the input-image generation section 202, the input-image acquisition section 208, the estimation section 210, the composite-image generation section 216, and the parameter storage section 706 serve as sections of a foreground region estimation apparatus.

The above functions may be implemented by the processor 12 executing a program that is installed in the image processing apparatus 10, which is a computer, and that includes commands corresponding to the above functions. This program may be supplied to the image processing apparatus 10 via a computer-readable information storage medium such as an optical disc, a magnetic disc, a magnetic tape, a magneto-optical disc, or a flash memory, or via the internet, etc.

The input-image generation section 202 generates a plurality of the second input images 206 to which different image processing methods have been applied, on the basis of one image representing the background in a mode different from that in the first input image 204. It is to be noted that, as explained above, the input-image generation section 202 may generate, from an object formed by CG-modeling the background, the second input images 206 through a rendering.

The input-image acquisition section 208 acquires a combination of the first input image 204 representing the background and the foreground and the second input image 206 representing the background in a mode different from that in the first input image 204. The input-image acquisition section 208 may acquire the first input image 204 and the second input image 206 generated by the input-image generation section 202 or may acquire the first input image 204 and the second input image 206 inputted by the user.

The teacher-image acquisition section 704 acquires the first teacher image 214, the second teacher image 218, and the third teacher image 220. It is to be noted that, in a case where only learning based on the estimation data 212 is conducted, the teacher-image acquisition section 704 may acquire the first teacher image 214 only. Further, in a case where only learning based on the composite image 222 is conducted, the teacher-image acquisition section 704 may acquire the second teacher image 218 and the third teacher image 220 only.

The learning section 702 executes learning at the estimation section 210 on the basis of a given teacher image and the estimation data 212 that is generated when the first input image 204 and the second input image 206 are inputted to the estimation section 210. Further, the learning section 702 may further execute learning at the estimation section 210 on the basis of the first input image 204 and the composite image 222 that is generated when the estimation data 212, the second teacher image 218, and the third teacher image 220 are inputted to the composite-image generation section 216.

The estimation section 210 generates the estimation data 212 indicating the foreground region in the first input image 204 in response to input of the first input image 204 and the second input image 206. The estimation section 210 may be implemented by a machine learning model such as a CNN.

The composite-image generation section 216 generates the composite image 222 on the basis of the generated estimation data 212, the second teacher image 218, and the third teacher image 220. Alternatively, the composite-image generation section 216 may generate the composite image 222 on the basis of the estimation data 212 and the first input image 204.

The parameter storage section 706 stores the value of a parameter for the estimation section 210. During learning, the value of the parameter stored in the parameter storage section 706 is updated, as appropriate. On the other hand, in a case where the image processing apparatus 10 functions as a foreground region estimation apparatus, a parameter in a state where the estimation section 210 has conducted learning, is stored to be a fixed value in the parameter storage section 706.

As explained so far, the estimation data 212 and the composite image 222 can be easily obtained with high precision, according to the present embodiment.

The present invention exhibits the above effects by being implemented in the following scenes, for example. For example, during broadcasting of a sport such as basketball or electronic sport, a player who is moving can be extracted as a foreground. Further, a background may be eliminated from a real-time scene of entrance procession, and a player introduction video may be created. Further, a singer or a dancer can be extracted from a live video representing the singer singing a song or the dancer dancing. In addition, an image obtained by changing a background of an image photographed by a smartphone, camera, or the like owned by a user can be created. Moreover, in a case where a program is created at low cost without using a green screen, an actor who acts in a place other than a stage set can be extracted as a foreground and can be superimposed on the stage set which is a background. In addition, the present invention can be implemented also when a virtual reality (VR) video work is created. After a PS Camera (registered trademark) takes a video of a user playing a game, motion of the user can be extracted as a foreground. In addition, when a remotely working user joins a video conference, a room which is the background can be replaced with another image.

Second Embodiment

Figure 8:
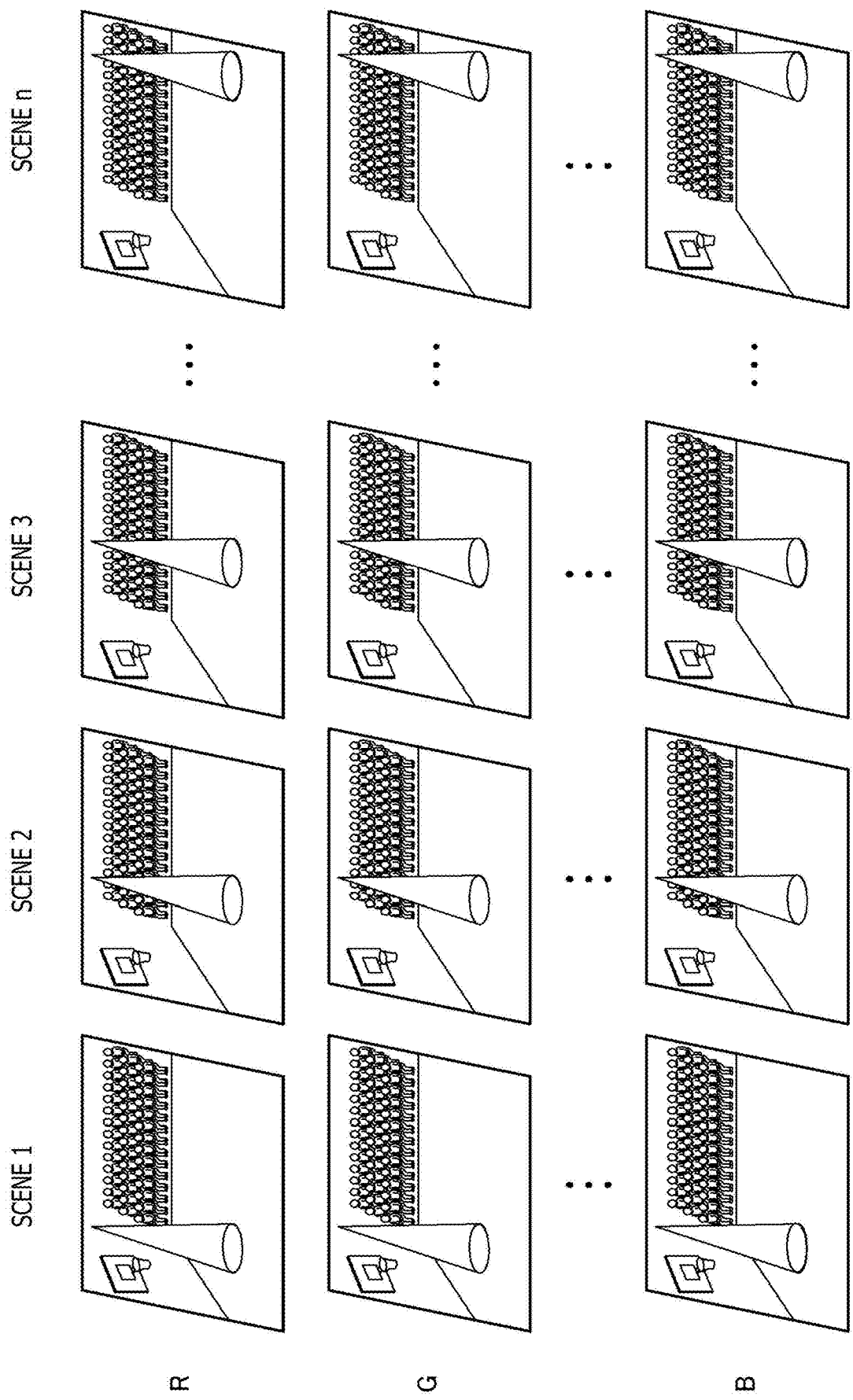
FIG. 8 is one example depicting second input image candidates according to a second embodiment.
Figure 9:
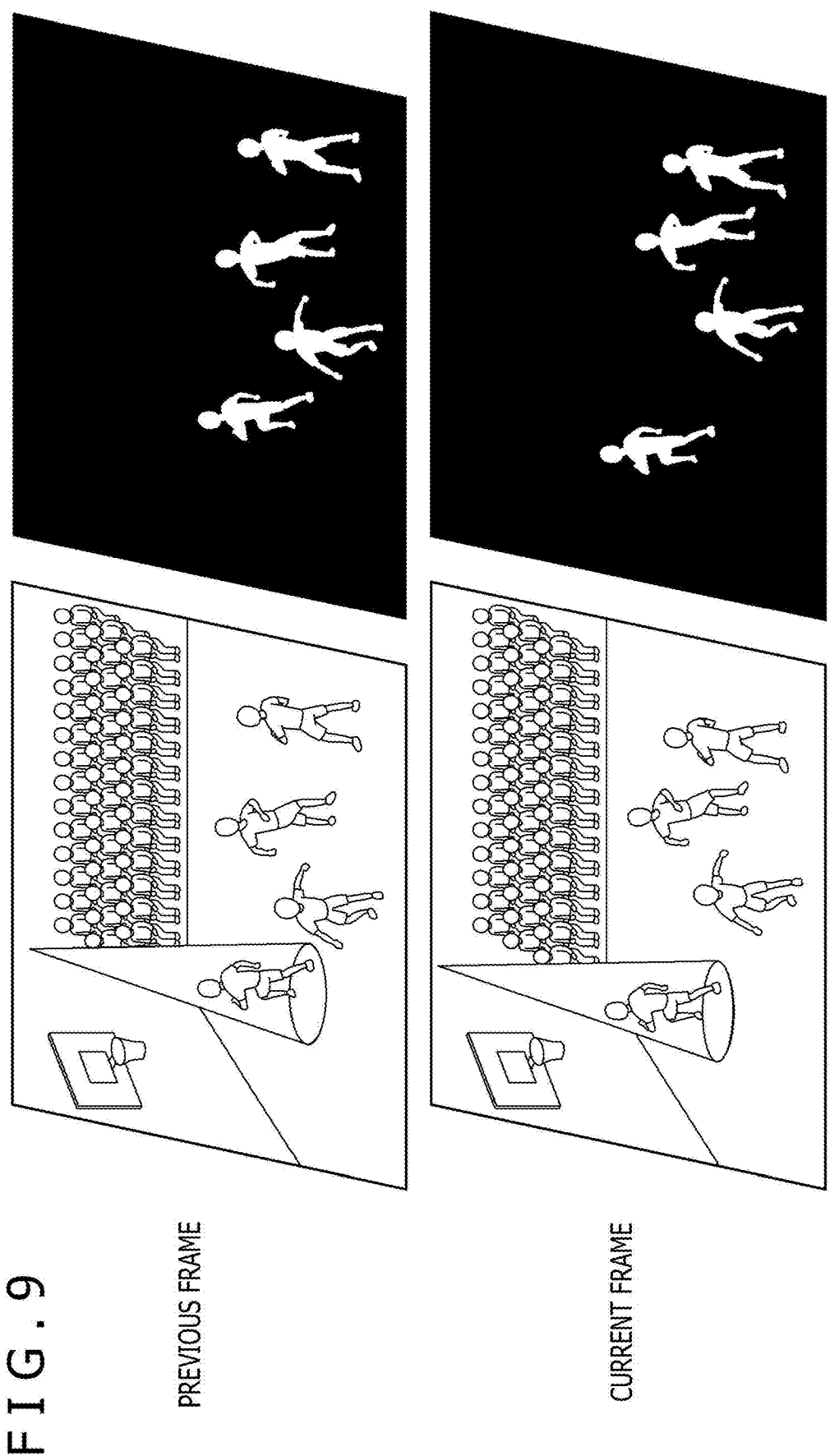
FIG. 9 is one example depicting a first input image and estimation data according to the second embodiment.
Figure 10:
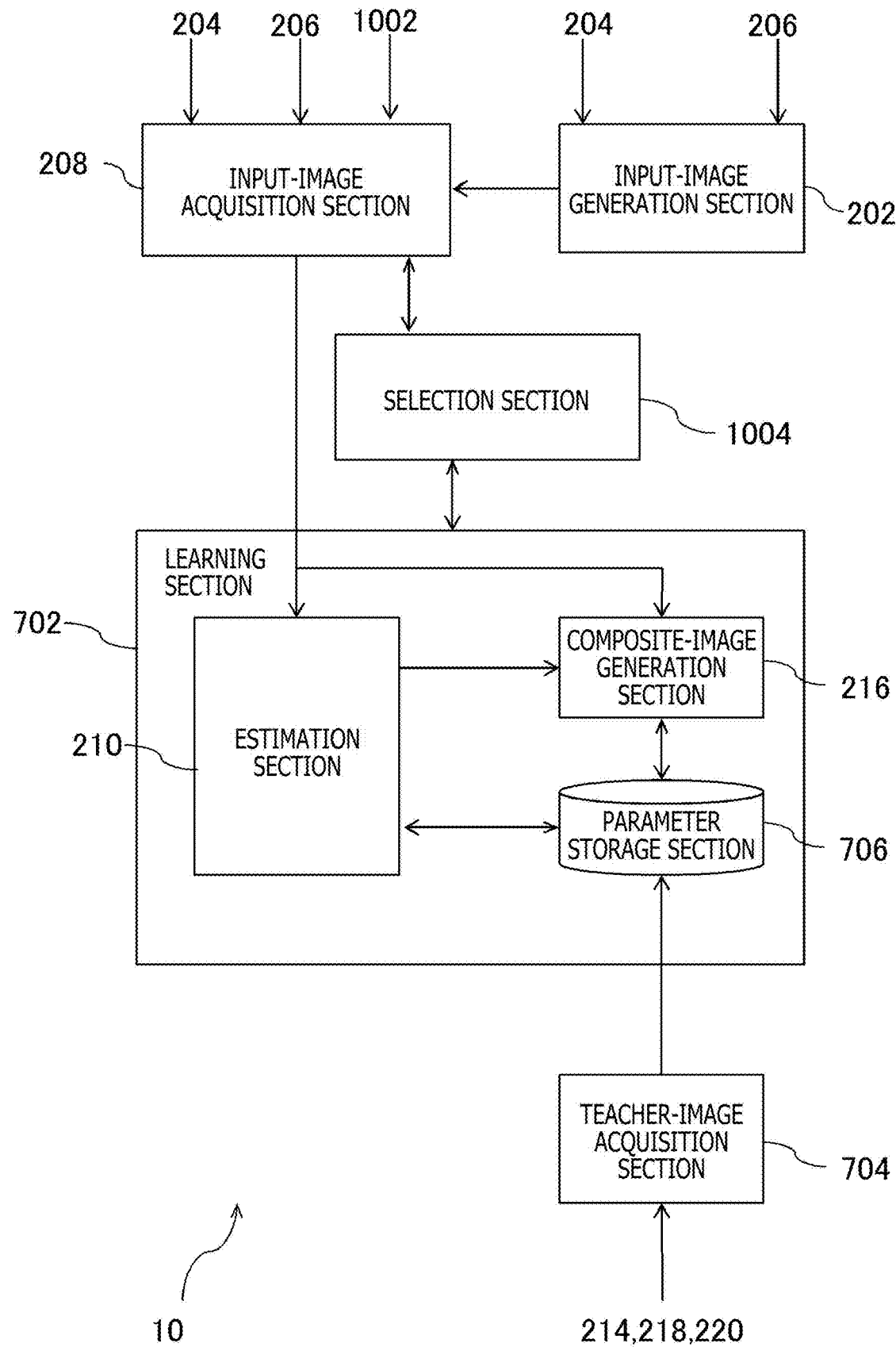
FIG. 10 is a functional block diagram depicting one example of functions which are implemented by an image processing apparatus according to the second embodiment.

Next, a second embodiment will be explained with reference to FIGS. 8 to 10. In the second embodiment, the image processing apparatus 10 includes a selection section 1004 (see FIG. 10) that selects one estimation data 212 set from among a plurality of the estimation data 212 sets generated on the basis of the common first input image 204 and a plurality of the second input images 206 inputted in combination with the common first input image 204. It is to be noted that FIG. 10 illustrates a configuration in which the selection section 1004 is provided outside the input-image acquisition section 208 and the learning section 702, but the selection section 1004 may be provided inside the input-image acquisition section 208 and/or the learning section 702.

Specifically, a case where a player in a court is illuminated with a spot light the color of which changes with time, will be explained. In this case, if the color of a player's clothing or the color of the court is close to the color of the spot light, there is a possibility that the estimation section 210 cannot generate the estimation data 212 indicating the foreground region with high precision.

In such a case, a user previously photographs a plurality of images obtained by photographing the background respectively illuminated with spot lights of various colors. The input-image acquisition section 208 acquires a plurality of the second input images 206 that are different only in the color of spot light. The estimation section 210 generates a plurality of the estimation data 212 sets on the basis of the common first input image 204 and the plurality of second input images 206 inputted in combination with the common first input image 204. Then, the selection section 1004 selects, from among the plurality of estimation data 212 sets, an estimation data 212 set having the smallest foreground occupation region. Accordingly, even if the size of the foreground occupation region varies with the change of the colors of the spot lights, an estimation data 212 set in which a portion that is unnecessary for the user is small can be obtained.

It is to be noted that the selection section 1004 may select, from among the plurality of estimation data 212 sets, an estimation data 212 set having the largest foreground occupation region. A criterion for the selection section 1004 to select the estimation data 212 is defined as desired according to a purpose of the user.

In addition, in a case where the image processing apparatus 10 functions as a foreground region estimation apparatus, the input-image acquisition section 208 may select and acquire, from among a plurality of second input image 206 candidates, a second input image 206 that corresponds to the first input image 204.

The candidates are a plurality of images respectively obtained by photographing the background by a plurality of cameras that are set at respective predetermined angles of view and in respective relative photographing directions. Specifically, the user previously photographs the background by using a plurality of cameras that are set so as to surround the periphery of a court. From among the plurality of images, the input-image acquisition section 208 acquires, as the second input image 206, an image photographed at an angle of view that is closest to that of the background included in the first input image 204. Therefore, the second input image 206 including a background that is closest to the background included in the first input image 204 is used, so that the estimation data 212 can be generated with high precision.

Further, the input-image acquisition section 208 may select and acquire, from among the candidates, the second input image 206 that corresponds to the first input image 204, by performing feature-point matching. Specifically, in the aforementioned example, the input-image acquisition section 208 performs feature-point matching of the first input image 204 and each of images photographed by the plurality of cameras that are set so as to surround the periphery of the court. Then, the input-image acquisition section 208 may acquire, as the second input image 206, an image photographed at an angle of view closest to that of the background included in the first input image 204, as a result of the feature-point matching.

Alternatively, the candidates may be a plurality of images obtained by photographing the background illuminated with lights of different colors. The input-image acquisition section 208 may select and acquire, from among the candidates, the second input image 206 that corresponds to the first input image 204 on the basis of pixel color information regarding a position of the background indicated by the estimation data 212 having been already generated.

Specifically, a case where a player in a court is illuminated with a spot light the color of which changes with time, will be explained. A user previously photographs a plurality of images obtained by photographing a background illuminated with spot lights of various colors. For example, while presupposing some scenes, the user photographs the background in which the spot light illuminates a particular position. Here, for each of the scenes (e.g., scenes 1 to n), the user photographs images (hereinafter, referred to R1 image, etc.) illuminated with spot lights of a plurality of colors (e.g., red, green, blue, etc.). FIG. 8 depicts one example of a group of images representing, for each of the scenes 1 to n, the background illuminated with red, green, and blue spot lights. The images of the background illuminated with spot lights of various colors for each of the scenes are the second input image 206 candidates.

Next, the input-image acquisition section 208 acquires the first input image 204. Here, it is assumed that the first input image 204 represents one scene of a video of a game taken in a state where a particular player is illuminated with a spot light, for example. FIG. 9 depicts one example of specific frames of such a video. In a case where the video is inputted to the foreground region estimation apparatus, the input-image acquisition section 208 sequentially acquires, as the first input images 204, frames included in the video.

The input-image acquisition section 208 selects and acquires the second input image 206 that correspond to an image of a previous frame in combination with the first input image 204 of the previous frame. For example, the input-image acquisition section 208 acquires the corresponding second input image 206 from among a plurality of the candidates on the basis of a position illuminated with the spot light and the color of the spot light in the previous frame. Here, for example, it is assumed that the input-image acquisition section 208 acquires the second input image 206 (R1 image) of scene 1 illuminated with a red spot light. Then, the estimation section 210 generates the estimation data 212 on the previous frame in FIG. 9 in response to input of the first input image 204 and the second input image 206.

In the following frame (current frame), the input-image acquisition section 208 acquires a still image of the current frame as the first input image 204 and selects and acquires the second input image 206 from among the candidates. Here, the input-image acquisition section 208 selects the second input image 206 from among the candidates on the basis of pixel data in a region indicated to be the background by the estimation data 212 generated in the previous frame.

Specifically, the R1 image acquired as the first input image 204 in the previous frame belongs to scene 1. Further, candidates (images including the R1 image, the G1 image, and the B1 image) belonging to scene 1 have the same pixel data in the region indicated to be the background by the estimation data 212. Thus, the input-image acquisition section 208 selects and acquires the second input image 206 from among the candidates (images including the R1 image, the G1 image, and the B1 image) belonging to scene 1. For example, when the color of the spot light is changed to blue during a transition from the previous frame to the current frame, the input-image acquisition section 208 acquires the B1 image as the second input image 206.

The first input images 204 of the current frame and the previous frame are different in the color of the spot light or the illuminated position because these first input images 204 are photographed at different times. However, it is highly probable that a change of the position illuminated with the spot light is small because a change of the position of a player in one frame is small. On the other hand, it is highly possible that a change of the color is great. Therefore, the second input image 206 is selected from among the second input image 206 candidates (the figures belonging to scene 1) in which the same position is illuminated with the spot light. Accordingly, the precise estimation data 212 can be obtained.

In addition, in the above case, to select the second input image 206 in the current frame, the input-image acquisition section 208 may select the second input image 206 from among the candidates belonging to a scene following the scene selected in the previous frame. As an image of each scene behind the second input image 206, an image where which position is illuminated with the spot light during a game is predicted is adopted. Accordingly, the precise estimation data 212 can be obtained.

Further, the candidates may be images each generated to represent the background in a state of being illuminated with a light, from a background representing image photographed in a state of not being illuminated with the light, on the basis of a reflection characteristic of each item included in the background.

Specifically, for example, the user first acquires, from an image obtained by photographing a background, a reflection characteristic of each subject included in the background. Here, the user photographs the background image in a state where specular light or the like is not included in the image. In a case where the first input image 204 is a video image, the input-image generation section 202 estimates (or previously acquires) movement of the illumination in the video image. In addition, the input-image generation section 202 creates the second input image 206 of each frame by simulating lighting on the basis of the movement of the illumination and the reflection characteristic. Then, the input-image acquisition section 208 acquires, as the second input image 206, the image generated to represent the background in the illuminated state. Accordingly, the second input image 206 illuminated with the light in various modes can be acquired.

Third Embodiment

Figure 11:
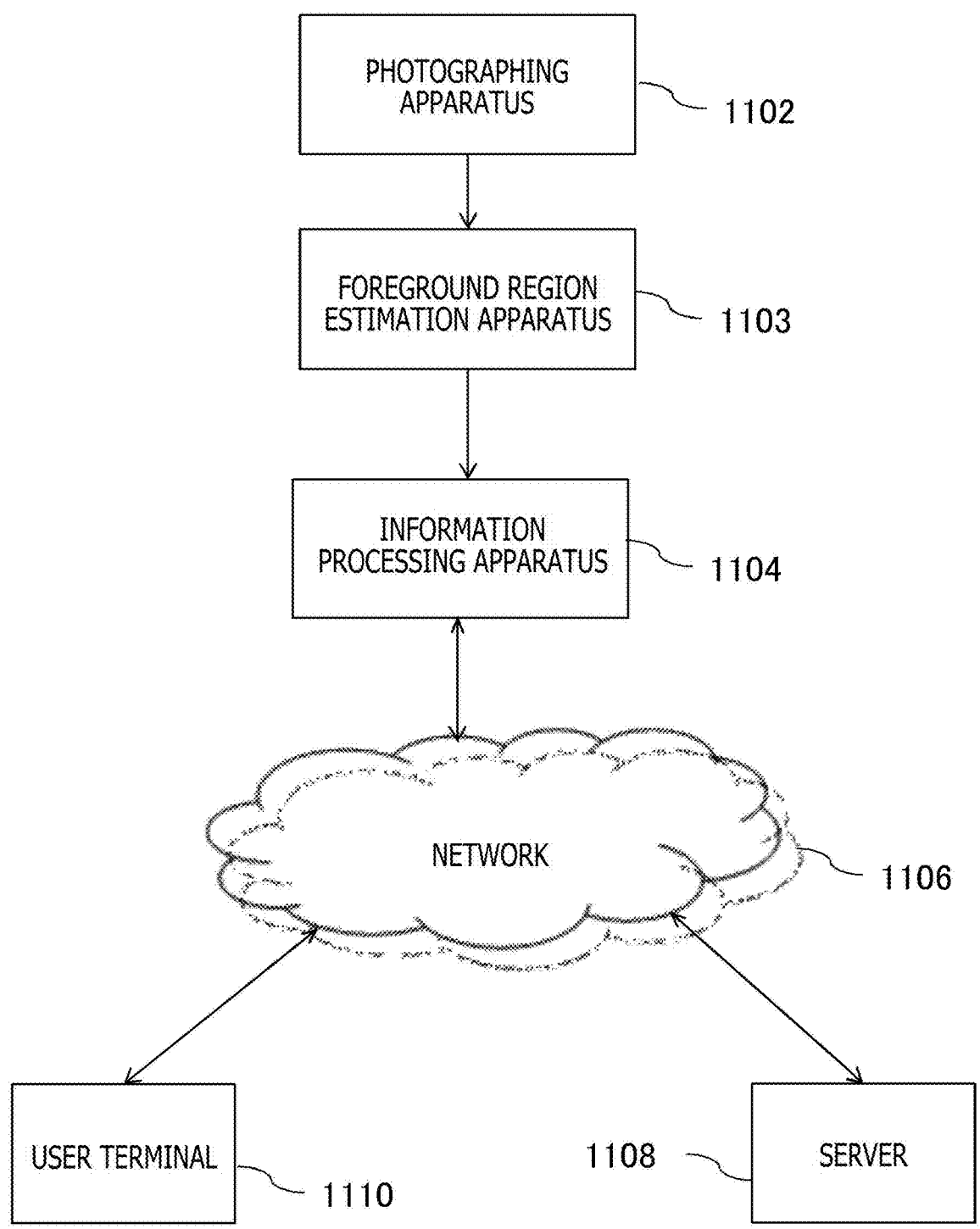
FIG. 11 is a diagram depicting an application example of a third embodiment.
Figure 12:
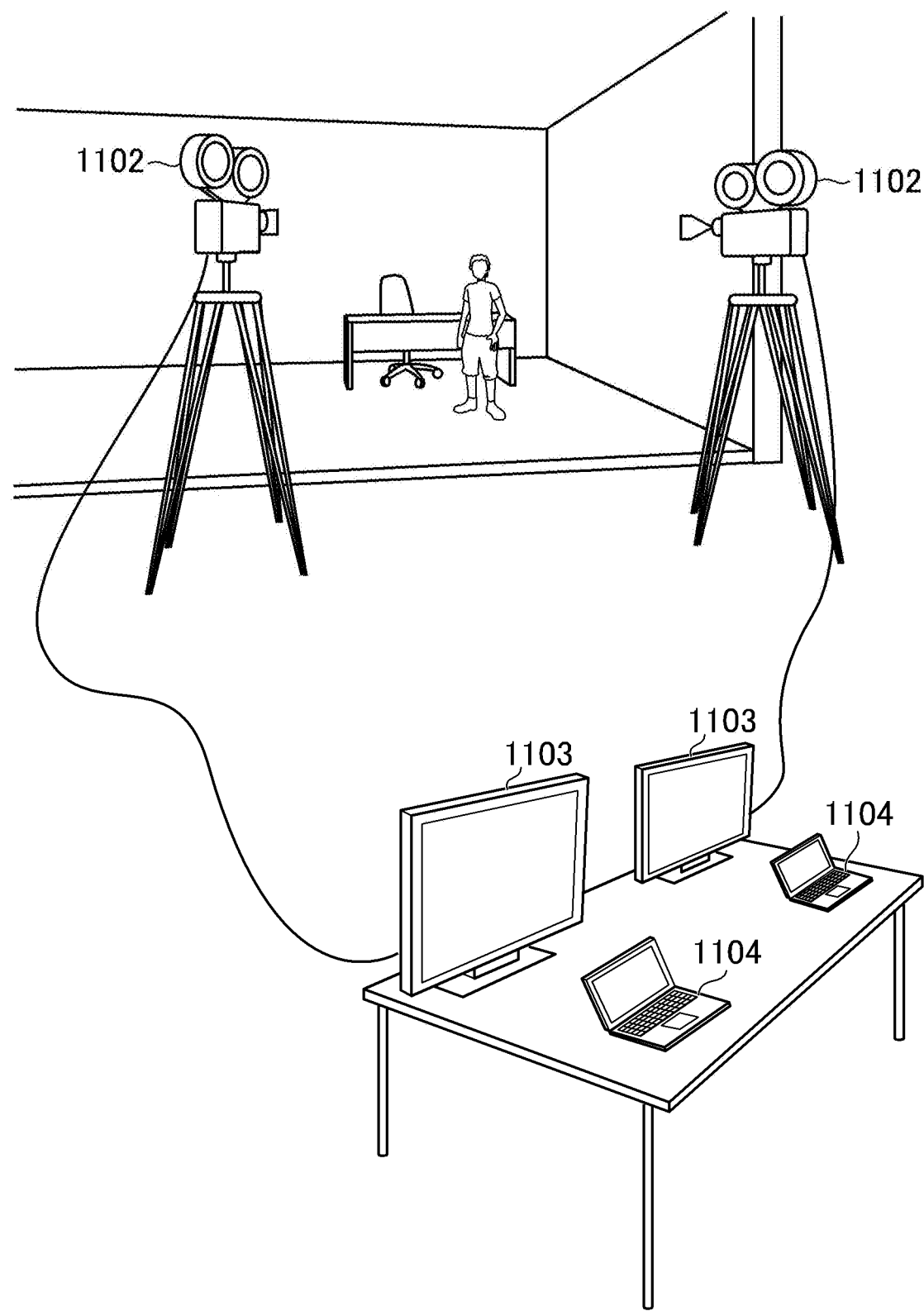
FIG. 12 is a diagram depicting another application example of the third embodiment.

Next, a third embodiment will be explained with reference to FIGS. 11 and 12. FIGS. 11 and 12 are diagrams each depicting an application example of the third embodiment. Specifically, FIG. 11 includes a photographing apparatus 1102, a foreground region estimation apparatus 1103, an information processing apparatus 1104, a server 1108, and a user terminal 1110. The information processing apparatus 1104, the server 1108, and the user terminal 1110 are connected via a network 1106. The network 1106 is the internet, for example.

The photographing apparatus 1102 is an apparatus, such as a video camera, that takes a video image. The photographing apparatus 1102 is set in a studio, for example, and takes a video image that includes a table or wall as the background thereof, and a human as the foreground thereof. The photographing apparatus 1102 takes a video image while changing the photographing direction toward the human if the human moves in the studio. In addition, as depicted in FIG. 12, a plurality of the photographing apparatuses 1102 may be provided. In this case, the photographing apparatuses 1102 include a first video camera and a second video camera and take video images from a plurality of directions.

As in the first and second embodiments, the foreground region estimation apparatus 1103 generates estimation data indicating a foreground region from images including a background and a foreground. Here, in the third embodiment, the input-image acquisition section 208 further acquires a third input image which is a still image constituting a portion of video images sequentially taken in different photographing directions. The third input image is a still image constituting a video image taken by the photographing apparatus 1102, for example.

In the third embodiment, the second input image 206 is an image acquired on the basis of a plurality of candidate images previously photographed in different photographing directions. Specifically, the plurality of candidate images are a plurality of images photographed in various photographing directions from a photographing position assumed to photograph a third input image. From among the plurality of candidate images, an image photographed in a photographing direction closest to the photographing direction in which the third input image is photographed, is selected as the second input image 206. For example, in a case where the third input image is an image photographed in a direction in which a chair and a table are disposed from the position of the first video camera, an image photographed in a direction closest to the direction of the chair and the table from the position of the first video camera is selected as the second input image 206 from among the plurality of candidate images. Selection of the second input image 206 may be made by the selection section 1004 included in the image processing apparatus 10, as in the second embodiment.

Further, the second input image 206 may be generated on the basis of an image selected on the basis of the difference between each of the photographing directions of the plurality of candidate images and the photographing direction in which the third input image is photographed. For example, in a case where the candidate images include images photographed in photographing directions deviated to the left and right side by five degrees from the photographing direction in which the third input image is photographed, these two candidate images are selected. Alternatively, an image generated by photographing from the intermediate direction on the basis of the two candidate images may be used as the second input image 206.

Subsequently, the estimation section 210 generates the estimation data 212 indicating the foreground region in response to input of the third input image and the second input image 206. The third embodiment is similar to the first and second embodiments, except for a difference that, in the third embodiment, the third input image is inputted in place of the first input image 204. In addition, the foreground region estimation apparatus 1103 generates the composite image 222 on the basis of the estimation data 212, as in the first and second embodiments. In the present embodiment, the photographing apparatus 1102 photographs a third input image for each frame. Accordingly, the foreground region estimation apparatus 1103 generates the composite image 222 for each frame. As a result, a composite video formed of the composite images 222 is generated.

For example, the information processing apparatus 1104 and the server 1108 are computation apparatuses such as personal computers, etc. The information processing apparatus 1104 has a communication function and carries out data communication with the server 1108 or the user terminal 1110. For example, the user terminal 1110 is a personal computer or a game apparatus. The user terminal 1110 communicates with the server 1108 or the information processing apparatus 1104 and displays received data. The information processing apparatus 1104 distributes the composite video to the user terminal 1110 directly or via the server 1108, so that the user can view the composite video.

It is to be noted that FIG. 11 depicts the configuration in which the foreground region estimation apparatus 1103 is disposed between the photographing apparatus 1102 and the information processing apparatus 1104. However, the foreground region estimation apparatus 1103 may be included in the user terminal 1110, or the foreground region estimation apparatus 1103 may be connected to the user terminal 1110. In this case, the input-image acquisition section 208 included in the foreground region estimation apparatus 1103 acquires, from the photographing apparatus 1102, the aforementioned third input image via the information processing apparatus 1104 and the network 1106. According to the present configuration, a user can generate a composite video by using the user terminal 1110 owned by the user or the foreground region estimation apparatus 1103. In addition, the user can upload an originally created user's composite image to the server 1108 such that the composite image can be shared with other users.

It is to be noted that the present invention is not limited to the aforementioned embodiments. Further, the specific character strings and numerical values described above and the specific character strings and numerical values in the drawings are exemplifications, and no limitation is put on these character strings and numerical values.

The invention claimed is:

1. A learning apparatus comprising:
processing circuitry configured to
acquire a combination of a first input image representing a background and a foreground and a second input image representing the background in a mode different from that in the first input image, wherein the different mode includes a case where a position or a shape of an item included in the background is different;
acquire a combination of the common first input image and each of a plurality of second input images to which different image processing methods have been applied including setting different gamma values or adding different noises to one image representing the background in a mode different from that in the first input image; and
generate estimation data indicating the foreground region in the first input image in response to input of the first input image and the second input image, and conduct learning based on a given teacher image and the estimation data that is generated in response to inputting the first input image and the second input image.

2. The learning apparatus according to claim 1, wherein the given teacher image includes a first teacher image representing the foreground region in the first input image.

3. The learning apparatus according to claim 2, wherein the given teacher image includes a second teacher image representing the foreground in a mode the same as that in the first input image, and a third teacher image representing the background in a mode the same as that in the first input image,
wherein the processing circuitry is further configured to
generate a composite image based on the generated estimation data, the second teacher image, and the third teacher image, and conduct learning based on the first input image and the composite image that is generated in response to inputting the estimation data, the second teacher image, and the third teacher image.

4. The learning apparatus according to claim 1, wherein the processing circuitry is further configured to
acquire, from an object formed by computer graphics-modeling the background, the second input image generated through a rendering.

5. The foreground region estimation apparatus according to claim 1, wherein the given teacher image includes a first teacher image that is estimation data indicating a foreground region in the first input image, a second teacher image indicating only the foreground in the first input image, and a third teacher image includes a background included in the first input image and a background represented by a region occupied by the foreground in the first input image.

6. A foreground region estimation apparatus comprising:
processing circuitry configured to
acquire a combination of a first input image representing a background and a foreground and a second input image representing the background in a mode different from that in the first input image, wherein the different mode includes a case where a position or a shape of an item included in the background is different;
acquire a combination of the common first input image and each of a plurality of second input images to which different image processing methods have been applied including setting different gamma values or adding different noises to one image representing the background in a mode different from that in the first input image; and
generate estimation data indicating the foreground region in response to input of the first input image and the second input image, wherein
a machine learning model conducts learning based on a given teacher image and the estimation data that is generated in response to inputting the first input image and the second input image.

7. The foreground region estimation apparatus according to claim 6, wherein
the given teacher image includes a first teacher image representing the foreground region in the first input image.

8. The foreground region estimation apparatus according to claim 7, wherein the processing circuitry is further configured to
generate a composite image based on the generated estimation data, the first input image, and the second input image,
the given teacher image includes a second teacher image representing the foreground in a mode the same as that in the first input image, and a third teacher image representing the background in a mode the same as that in the first input image, and
a machine learning model having conducted learning based on the first input image and the composite image that is generated in response to inputting the estimation data, the second teacher image, and the third teacher image.

9. The foreground region estimation apparatus according to claim 8, wherein the processing circuitry is further configured to
acquire, from among a plurality of candidates of the second input image, the second input image that corresponds to the first input image.

10. The foreground region estimation apparatus according to claim 9, wherein
the candidates are a plurality of images obtained by photographing the background respectively by a plurality of cameras that are set at respective predetermined angles of view and in respective relative photographing directions.

11. The foreground region estimation apparatus according to claim 9, wherein the processing circuitry is further configured to
acquire, from among the candidates, the second input image that corresponds to the first input image by performing feature-point matching.

12. The foreground region estimation apparatus according to claim 9, wherein
the candidates are a plurality of images obtained by photographing the background illuminated with lights of different colors, and
the processing circuitry is further configured to select and acquire, from among the candidates, the second input image that corresponds to the first input image based on pixel color information regarding a position of the background indicated by the estimation data having been already generated.

13. The foreground region estimation apparatus according to claim 9, wherein
the candidates are images generated to represent the background in a state of being illuminated with a light, from an image representing the background photographed in a state of not being illuminated with the light, based on a reflection characteristic of each item included in the background.

14. The foreground region estimation apparatus according to claim 6, wherein the processing circuitry is further configured to select one piece of estimation data from among a plurality of pieces of the estimation data generated based on the common first input image and a plurality of the second input images inputted in combination with the common first input image.

15. The foreground region estimation apparatus according to claim 6, wherein the processing circuitry is further configured to
acquire a third input image that is a still image constituting a portion of video images sequentially taken in different photographing directions, the second input image is acquired based on a plurality of candidate images that are previously photographed in different photographing directions, and
generate estimation data indicating the foreground region in response to input of the third input image and the second input image.

16. The foreground region estimation apparatus according to claim 15, wherein
an image photographed in a photographing direction closest to a photographing direction in which the third input image is photographed is selected as the second input image from among the plurality of candidate images.

17. The foreground region estimation apparatus according to claim 15, wherein
the second input image is generated based on an image selected based on a difference between a photographing direction of each of the plurality of candidate images and a photographing direction in which the third input image is photographed.

18. A learning method comprising:
acquiring a combination of a first input image representing a background and a foreground and a second input image representing the background in a mode different from that in the first input image, wherein the different mode includes a case where a position or a shape of an item included in the background is different;
acquire a combination of the common first input image and each of a plurality of second input images to which different image processing methods have been applied including setting different gamma values or adding different noises to one image representing the background in a mode different from that in the first input image;
conducting learning based on a given teacher image and estimation data that is generated in response to inputting the first input image and the second input image; and
generating the estimation data indicating the foreground region in response to input of the first input image and the second input image.

19. A foreground region estimation method comprising:
acquiring a combination of a first input image representing a background and a foreground and a second input image representing the background in a mode different from that in the first input image, wherein the different mode includes a case where a position or a shape of an item included in the background is different;
acquiring a combination of the common first input image and each of a plurality of second input images to which different image processing methods have been applied including setting different gamma values or adding different noises to one image representing the background in a mode different from that in the first input image;
generating estimation data indicating the foreground region by inputting the first input image and the second input image, wherein a machine learning model having conducted learning based on a given teacher image and the estimation data that is generated in response to inputting the first input image and the second input image.

20. A non-transitory computer-readable storage medium storing computer-readable instructions thereon which, when executed by a computer, cause the computer to perform a method, the method comprising:
acquiring a combination of a first input image representing a background and a foreground and a second input image representing the background in a mode different from that in the first input image, wherein the different mode includes a case where a position or a shape of an item included in the background is different;
acquiring a combination of the common first input image and each of a plurality of second input images to which different image processing methods have been applied including setting different gamma values or adding different noises to one image representing the background in a mode different from that in the first input image;
conducting learning based on a given teacher image and estimation data that is generated in response to inputting the first input image and the second input image; and
generating the estimation data indicating the foreground region in response to input of the first input image and the second input image.

21. A non-transitory computer-readable storage medium storing computer-readable instructions thereon which, when executed by a computer, cause the computer to perform a method, the method comprising:

acquiring a combination of a first input image representing a background and a foreground and a second input image representing the background in a mode different from that in the first input image, wherein the different mode includes a case where a position or a shape of an item included in the background is different;

acquiring a combination of the common first input image and each of a plurality of second input images to which different image processing methods have been applied including setting different gamma values or adding different noises to one image representing the background in a mode different from that in the first input image; and generating estimation data indicating the foreground region, by inputting the first input image and the second input image, wherein a machine learning model having conducted learning based on a given teacher image and the estimation data that is generated in response to inputting the first input image and the second input image.

* * * * *